United States Patent [19]
Yamakami

[11] Patent Number: 5,876,096
[45] Date of Patent: *Mar. 2, 1999

[54] POWER SEAT DRIVING APPARATUS FOR A VEHICLE

[75] Inventor: Gensaku Yamakami, Seta-gun, Japan

[73] Assignee: Mitsuba Corporation, Kiryu, Japan

[*] Notice: The term of this patent shall not extend beyond the expiration date of Pat. No. 5,462,337.

[21] Appl. No.: 471,392

[22] Filed: Jun. 6, 1995

Related U.S. Application Data

[63] Continuation of Ser. No. 115,559, Sep. 3, 1993, Pat. No. 5,462,337.

[30] Foreign Application Priority Data

Sep. 4, 1992 [JP] Japan .................................. 4-262829

[51] Int. Cl.⁶ .................................................. A47C 1/02
[52] U.S. Cl. .................................. 297/344.13; 192/48.1; 74/665 GD; 74/89.15
[58] Field of Search .................................... 297/330, 327, 297/329, 344.12, 344.13, 344.15, 344.17, 344.18, 344.2; 248/422, 421, 394, 396; 192/48.1, 48.91; 74/665 GD, 89.15

[56] References Cited

U.S. PATENT DOCUMENTS

| | | | |
|---|---|---|---|
| 2,839,124 | 7/1958 | Desmond et al. | 297/344.17 X |
| 2,919,744 | 1/1960 | Tanaka | 297/344.13 X |
| 3,022,681 | 2/1962 | Cook | 74/665.6 D X |
| 3,125,318 | 3/1964 | Lohr et al. | 248/419 |
| 3,194,530 | 7/1965 | Heyl, Jr. | 248/419 |
| 5,014,958 | 5/1991 | Harney | 297/344.13 X |

FOREIGN PATENT DOCUMENTS

| | | |
|---|---|---|
| 58-89429 | 5/1983 | Japan . |
| 61-77538 | 4/1986 | Japan . |
| 63-159151 | 7/1988 | Japan . |
| 63-159152 | 7/1988 | Japan . |
| 63-159153 | 7/1988 | Japan . |
| 63-159154 | 7/1988 | Japan . |
| 63-162348 | 7/1988 | Japan . |
| 63-199138 | 8/1988 | Japan . |
| 63-199139 | 8/1988 | Japan . |

Primary Examiner—Milton Nelson, Jr.
Attorney, Agent, or Firm—Oliff & Berridge, PLC

[57] ABSTRACT

A driving apparatus which is capable of adjusting the forward and backward position and the height of a seat section by using a single motor to reduce the weight of the apparatus and simplify the structure. Nut members are mounted on operating threaded shafts which are rotated in normal or reverse by an electric motor so that the operating threaded shafts go through the nut members. A nut body constituting each nut member is structured so as to be engaged with one of first and second clutch members by a clutch operating member. In the first shift condition where the nut body is engaged with the first clutch body, power is turned on and the nut member moves back and forth relative to the operating threaded shaft. In the second shift condition where the nut is engaged with the second clutch body, power is turned off to hinder the movement of the nut member. The system of the apparatus is arranged so that the first nut members adjust the forward and backward position of the seat section and the second nut member adjusts the heights of the seat at the front and rear ends.

14 Claims, 6 Drawing Sheets 5,876,096

POWER SEAT DRIVING APPARATUS FOR A VEHICLE

This is a Continuation of application Ser. No. 08/115,559 filed Sep. 3, 1993, now U.S. Pat. No. 5,462,337.

BACKGROUND OF THE INVENTION

1. Field of the Invention

The present invention relates to a power seat driving apparatus for a vehicle which is installed on a passenger car or truck.

2. Description of Related Art

Generally, a seat installed on a passenger car or truck can be adjusted by moving the seat back and forth corresponding to the physique of a driver. Additionally, some seats can be adjusted with regard to the seat height at the front and rear ends to make the driver more comfortable. For the purpose, it has been proposed that the adjustments of the horizontally longitudinal position of the seat section and the heights of the seat at the front and rear ends are performed by using an electric motor. In conventional apparatuses, dedicated motors are used for each driving part to achieve such adjustment of each part of the seat because the operating positions and directions are different from each other and so each adjusting device is driven by an electric motor. However, this kind of system uses a large number of parts, not only complicating the structure but also enlarging the size of the seat driving system. For this reason, the space where other various functions will be loaded may decrease and further assembly becomes complicated, increasing manufacturing cost.

SUMMARY OF THE INVENTION

Accordingly, an object of the present invention is to provide a power seat driving apparatus for a vehicle which is capable of solving the problems mentioned above. To achieve the above object, according to one aspect of the present invention, there is provided a power seat driving apparatus for a vehicle comprising; an electric motor mounted in a seat section; a plurality of operating threaded shafts which are rotated by the electric motor and; nut members which are mounted integratedly on the body of the apparatus and screwed to the operating threaded shafts, the driving apparatus being structured to move the seat section back and forth relative to the operating threaded shafts by a movement of at least one nut member mounted on an operating threaded shaft, driven by the operating threaded shaft accompanied by the normal or reverse rotation of the electric motor, the power seat driving apparatus for a vehicle further including second nut members mounted on the operating threaded shafts and being structured to selectively achieve a different adjustment of a seat from the adjustment of the horizontally longitudinal position of the seat section by the movement of the second nut members relative to the operating threaded shafts, comprising; the operating threaded shafts on whose circumference a locking section is formed; a casing in which an operating threaded shaft movably goes through a nut member mounted thereon; the nut body supported rotatably in the axial dimension by the casing while the operating threaded shaft is screwed through the nut body; a first clutch body through which the operating threaded shaft passes so that the first clutch body can rotate and move axially and which is provided on one side of the nut body so that the clutch body is capable of being engaged with the one side; a second clutch body which the operating threaded shaft passes through while the second clutch body is engaged with the locking section of the operating threaded shaft and which rotates together with the operating threaded shaft, and which is further capable of moving axially relative to the operating threaded shaft; a connecting lever which supportedly connects the first and second clutch bodies which are located facing each other across the nut body, having a length which makes one clutch body disengage from the nut body when the other clutch body is engaged with the nut body means for hindering the rotation of the first clutch body while the rotation of the second clutch body is permitted and; a clutch operating means which switches the clutch bodies between the first shift condition where the first clutch body is engaged with the nut body and the second shift condition where the second clutch body is engaged with the nut body.

BRIEF DESCRIPTION OF THE DRAWINGS

FIG. 4 is a schematic sectional view along 4—4 showing the condition where the nut member of FIG. 3 is turned on.

FIG. 8 is a schematic perspective view showing the condition where the nut member of a third embodiment is turned on.

DESCRIPTION OF THE PREFERRED EMBODIMENTS

Figure 1:
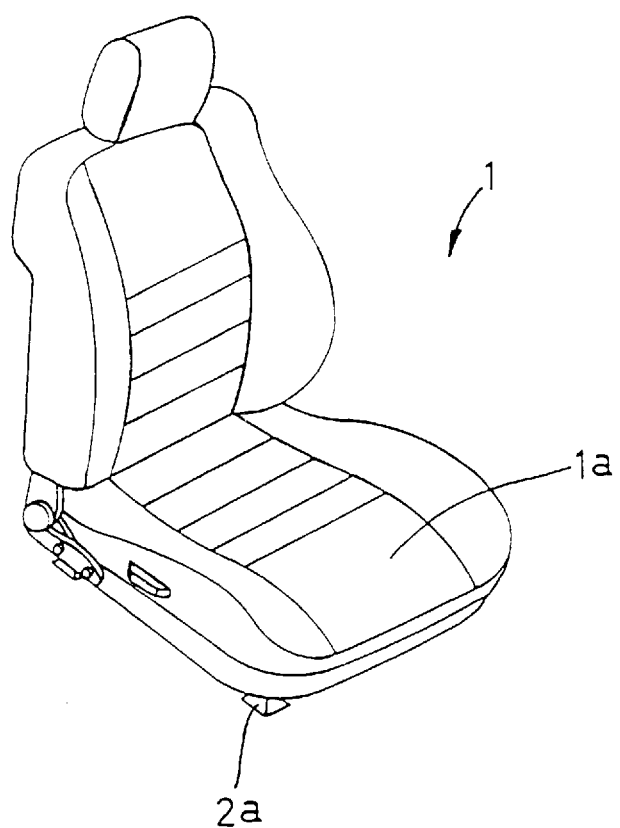
FIG. 1 is a schematic perspective view of the seat section.
Figure 2:
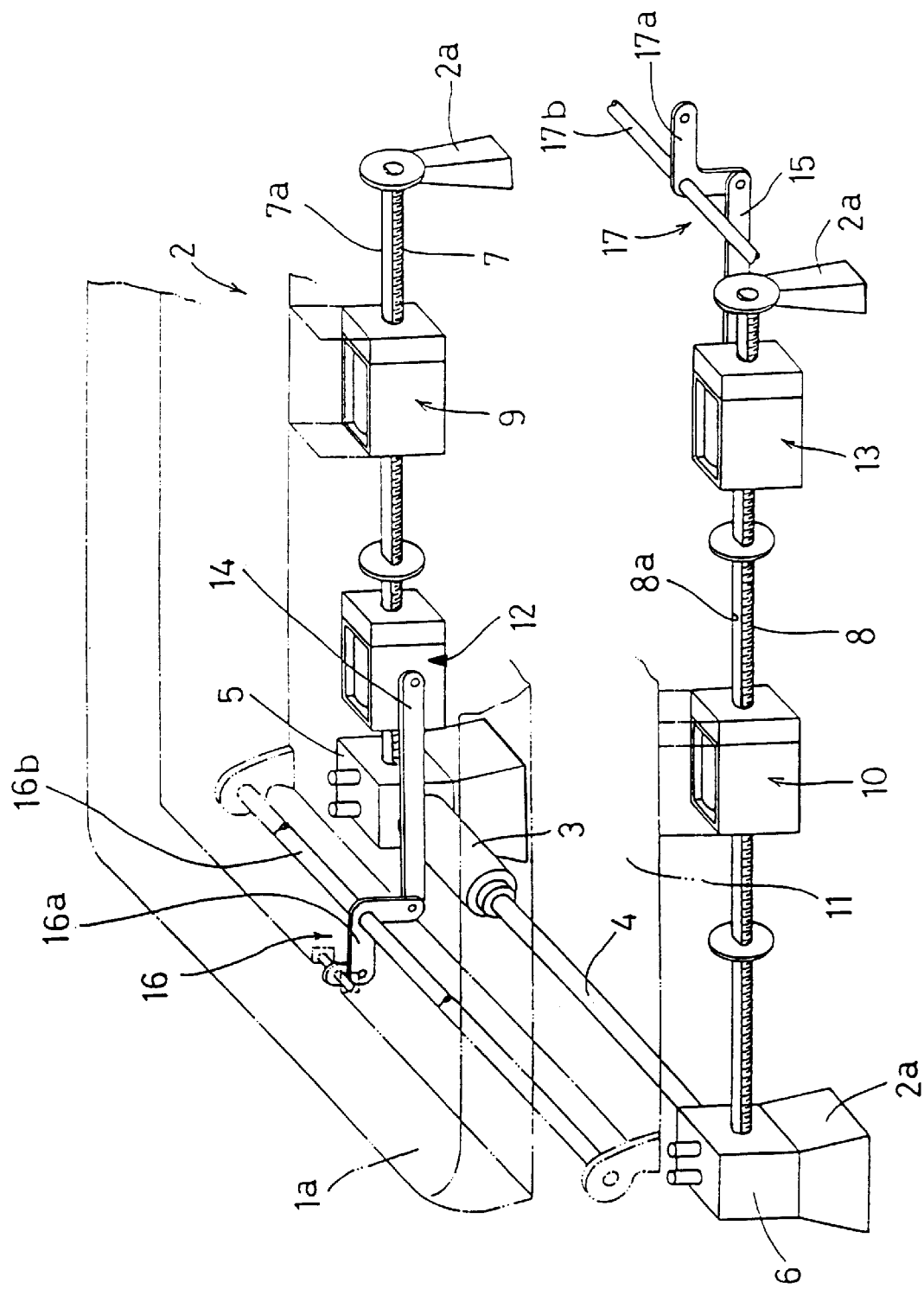
FIG. 2 is a schematic explanatory view showing an arrangement of an electric driving apparatus for a seat.
Figure 3:
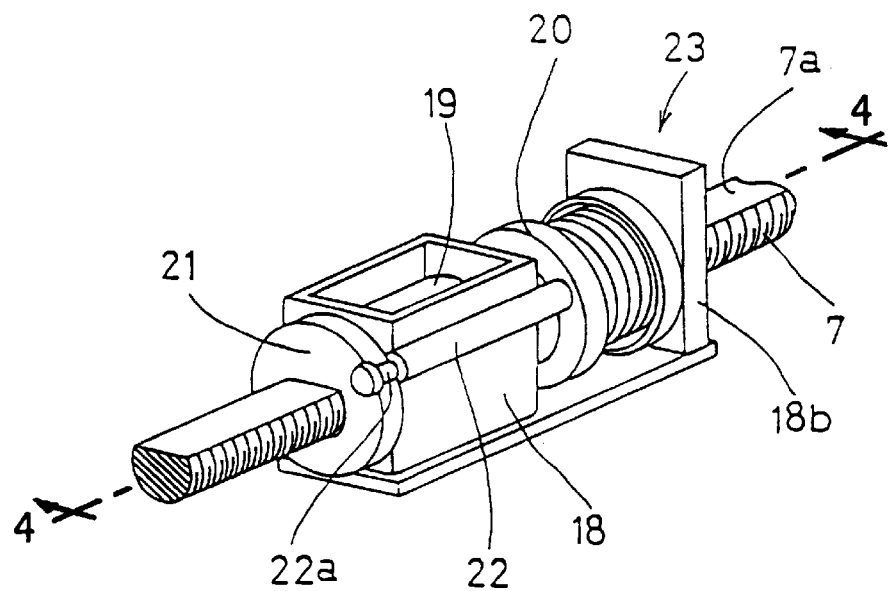
FIG. 3 is a schematic perspective view of the nut member.
Figure 4:
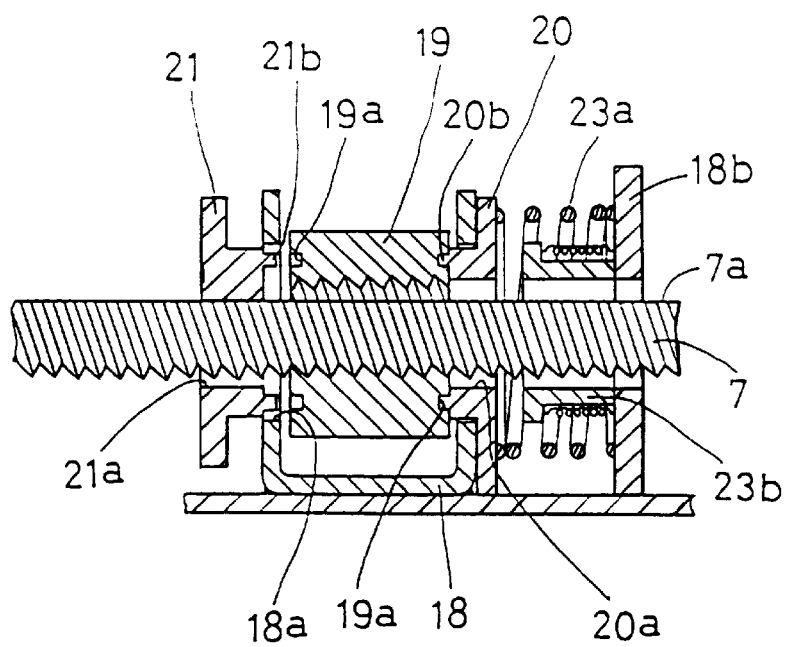
Figure 5:
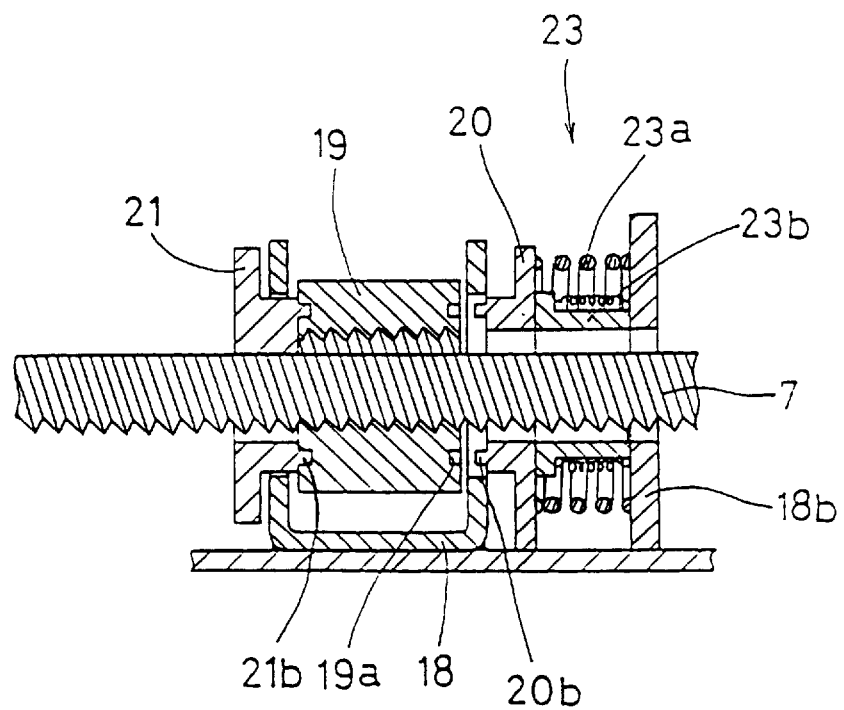
FIG. 5 is a schematic sectional view along 4—4 showing the condition where the nut member of FIG. 3 is turned off.

An embodiment of the present invention will be described with reference to the accompanying drawings. In FIG. 1, reference numeral 1 indicates a seat section which is to be disposed in a vehicle, such as a passenger car or truck. An electric driving apparatus 2 which is an embodiment of the present invention is disposed under the seat section 1 and structured to be able to not only move the seat section 1 back and forth, but also adjust the heights of the front and back portions of a seat 1a constituting the seat section.

The electric driving apparatus 2 is located under the seat section 1 and integratedly mounted on the floor of a vehicle. An output shaft 4 extends from an electric motor 3, of the electric driving apparatus 2, and is connected to decelerating gear devices 5, 6 provided on the right and left ends, respectively of the output shaft 4, the decelerating gear devices 5, 6 being integratedly fixed to supports 2a integratedly provided on the floor surface. Reference numerals 7, 8 indicate first and second operating threaded shafts respectively, the axes of which extend longitudinally and on which circumferences engaging sections (although only one side of each shaft is chamfered in the present embodiment, two-side chamfering is acceptable and further engaging grooves are also acceptable) 7a, 8a are formed, respectively. The operating threaded shafts 7, 8 are rotated around their axes in synchronization with the driving of the electric motor 3. The back ends of the shafts are rotatably supported by the supports 2a integratedly provided on the floor and the front ends of the shafts are connected to the decelerating gear devices 5, 6, so that the decelerated driving force of the electric motor 3 is transmitted to the first and second operating threaded shafts 7, 8. The operating threaded shafts 7, 8 are threadedly engaged with, respectively, first nut members 9, 10 which are located in the respective middle portions of the operating threaded shafts 7, 8, the nut members being moved back and forth relative to the operating threaded shafts 7, 8 by the rotation of the operating threaded shafts 7, 8. The first nut members 9, 10 are fixed to a movable bracket 11 on which the seat section 1 is integratedly mounted. As described later, when the apparatus is powered on, the seat section 1 is moved back and forth by the back and forth movement of the first nut members 9, 10 relative to the operating threaded shafts 7, 8 based on the rotation of the operating threaded shafts 7, 8.

A second nut member 12 is threadedly engaged with the operating threaded shaft 7 in front of the first nut member 9 of the first operating threaded shaft 7, and a second nut member 13 is threadedly engaged with the operating threaded shaft 8 in the back of the first nut member 10 of the second operating threaded shaft 8. When the apparatus is powered on as described later, the second nut members 12, 13 are moved back and forth relative to the operating threaded shafts 7, 8 respectively in accordance with the rotation of the operating threaded shafts 7, 8. Further, the second nut members 12, 13 are connected to height adjusting devices 16, 17 disposed on the front and rear portions of the movable bracket 11 through connecting levers 14, 15, respectively. The height adjusting devices 16, 17, having operating arms 16a, 17a respectively. The centers of the operating arms 16a, 17a, are fixed to supporting levers 16b, 17b, respectively which are rotatably supported by the movable bracket 11, respectively. When the second nut members 12, 13 are moved back and forth relative to the operating threaded shafts 7, 8, the connecting levers 14, 15 are moved back and forth, thereby moving the other ends of the operating arms 16a, 17a up and down. The other ends of the operating arms 16a, 17a are connected to the front and rear portions of the seat section 1a to adjust the heights of the front and rear portions of the seat section 1a, respectively.

The first nut members 9, 10 and the second nut members 12, 13, which are provided on the first and second operating threaded shafts 7, 8 respectively, are configured as will be described below. The first and second nut members are set so that the movement of the first and second nut members relative to the operating threaded shafts 7, 8 can be selectively switched on to make a desired adjustment of the seat section 1. As the nut members 9, 10, 12, and 13 have the same structure, for the sake of convenience, only the first nut member 9 is described below.

The nut member 9 contains a nut body 19 in a casing 18, the casing having a through hole 18a through which the operating threaded shaft 7 movably passes so that the operating threaded shaft 7 is freely movable. The nut body 19 is engaged with the operating threaded shaft 7 so that the operating threaded shaft passes through the nut body 19, and the nut body 19, in the casing 18, is freely rotatable around the operating threaded shaft 7. The nut body 19 has engaging grooves 19a on both sides, or ends, in axial dimensions. A fixed member 18b, which the operating threaded shaft 7 passes through, moves axially relative to the operating threaded shaft 7 and is integratedly fixed to the casing 18. The fixed member 18b is equipped with a clutch operating means 23 which is described later and moves integratedly with the casing 18. Further, an approximately circular first clutch body 20 is provided axially on one side, or end of the nut body so that the clutch body 20 is not rotatable relative to the casing 18. A through hole 20a, provided in the first clutch body 20 has a larger diameter than the operating threaded shaft 7. The first clutch body 20 is held on the casing 18 so that it is axially movable relative to the operating threaded shaft 7. Additionally, an engagement protrusion 20b, which is engageable with the engaging groove 19a, of the nut body 19 is formed on the surface of the first clutch body 20 facing the nut body 19.

Figure 6A:
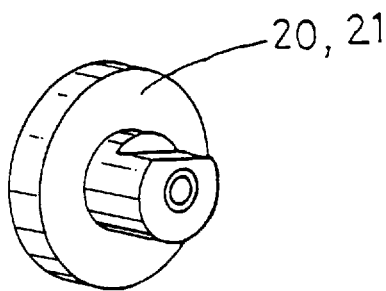
FIGS. 6A, B are schematic perspective views of the clutch body.
Figure 6B:
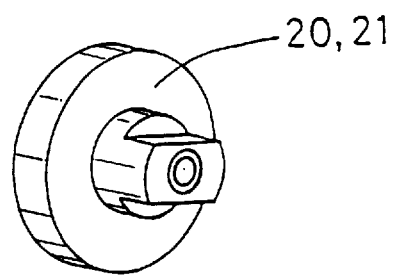

Further, an approximately circular second clutch body 21 is provided axially on the other side, or end of the nut body 19 and a through hole 21a is provided in the second clutch body 21. The through hole 21a has a surface opposing the locking section 7a of the operating threaded shaft 7, providing a shape to movably hold the operating threaded shaft 7. Thus the second clutch body 21 is capable of rotating together with the operating threaded shaft 7 and moving axially freely. Further, an engaging protrusion, which can be engaged with the engaging groove 19a formed on the other side, or end, of the nut body 19 is formed on the surface of the second clutch body 21 facing the nut body 19. The first clutch body 20 and the second clutch body 21, which are arranged to face each other across the nut body 19, are connected by means of a connecting rod 22 which has such a length that, when one of the clutch bodies 20 and 21 is engaged with the nut body 19, the other clutch body 21 or 20 is released from the engagement with the nut body 19. The connecting rod 22 is integratedly fixed to the first clutch body 20. The periphery of the second clutch body 21 is slidably engaged with an annular groove 22a provided on the connecting rod 22 so that the first and second clutch bodies move together axially. The first clutch body 20 is prevented from rotation. However, the second clutch body 21 is permitted to rotate freely. Meanwhile, the engagement of the clutch body 20, 21 with the nut body 19 is not confined to locking by engaging the protrusion 206, 216 with the engaging grooves 19a, engagment of chamfered sections, such as shown in FIGS. 6(A), 6(B) is also acceptable. The first clutch body 20 is freely movable in the axial dimension relative to the casing 18 and held so that it is unrotatable. Thus, shown in FIG. 7 of the second embodiment, the first clutch body 20 is structured to hinder rotation by making the bottom face of the first clutch body 20 contact the bottom surface of the casing 18. However the means for hindering the rotation of the first clutch body 20 is not confined to these embodiments.

Reference numeral 23 indicates the clutch operating means which selectively engages the first and second clutch bodies 20, 21 with the nut body 19. The clutch operating means 23 is provided between the fixed member 18b of the casing 18 and the first clutch body 20, and comprises a spring 23a which always energizes the first clutch body 20 to be engaged with the nut body 19 and an exciting coil 23b which is excited when powered on in order to disengage the first clutch body 20 from the nut body 19 against the action of the spring 23a and to cause the second clutch body 21 to be engaged with the nut body 19. When the first clutch body 20 is engaged with the nut body 19 (the second clutch 21 remains disengaged from the nut body 19), which condition is called the first shift when the operating threaded shaft 7 is rotating as described above, the nut body 19 is prevented from rotating by the first clutch body 20 which is engaged with the nut body 19. Consequently, the nut member 9 moves back and forth relative to the operating threaded shaft 7. However, when the second clutch body 21 is engaged with the nut body 19 (then the first clutch body 20 is disengaged from the nut body 19), which is called the second shift, the nut member 19 rotates together with the second clutch body 21 which is engaged with the nut body 19 as the operating threaded shaft 7 rotates. Consequently, the relative movement of the nut body 9 to the operating threaded shaft 7 is prevented.

The embodiment of the present invention configured as described above permits adjusting of the forward and backward position of the seat section 1 and the heights of the seat 1a at its front and rear ends. For example, when adjusting the height of the seat 1a at the front end, the exciting coil 23b contained in the clutch operating means 23 provided in the second nut body 12 is powered off, so that the nut body 19 is disengaged from the second clutch body 21 and is engaged with the first clutch body 20, which condition is referred to as the first shift. The exciting coils 23b of the other nut means 9, 10 and 13 are powered on to place the nut means 9, 10 and 13 in the second shift condition. Then, the electric motor 3 is driven in normal or reverse, moving only the nut member 12 back and forth relative to the operating threaded shaft 7 in order to adjust the height of the front end of the seat 1a. When adjusting the forward and backward position of the seat section 1, the nut bodies 19 in the first nut members 9, 10 are placed in the first shift condition and the nut members 12, 13 are placed in the second shift condition, and then, the electric motor 3 is driven.

As described above, the present invention has achieved automatic adjustments of the forward and backward position of the seat section 1 and the heights of the seat 1a at the front and rear ends by electric driving force. The adjustments of the forward and backward position of the seat section 1 and the heights of the seat 1a at the front and rear ends can be selected by controlling the power to be supplied to the exciting coils 23b by means of the clutch operating means 23 provided in the first and second nut members 9, 10, 12 and 13. Thus, the drive control of the adjusting devices can be achieved by driving a single electric motor, eliminating the necessity of mounting a dedicated motor on each adjusting device. As a result, a large number of the adjusting parts are used in common, thereby minimizing the number of the parts, reducing the weight of the apparatus, simplifying the structure of the apparatus and further simplifying assembly which leads to the reduction of manufacturing cost.

Figure 7:
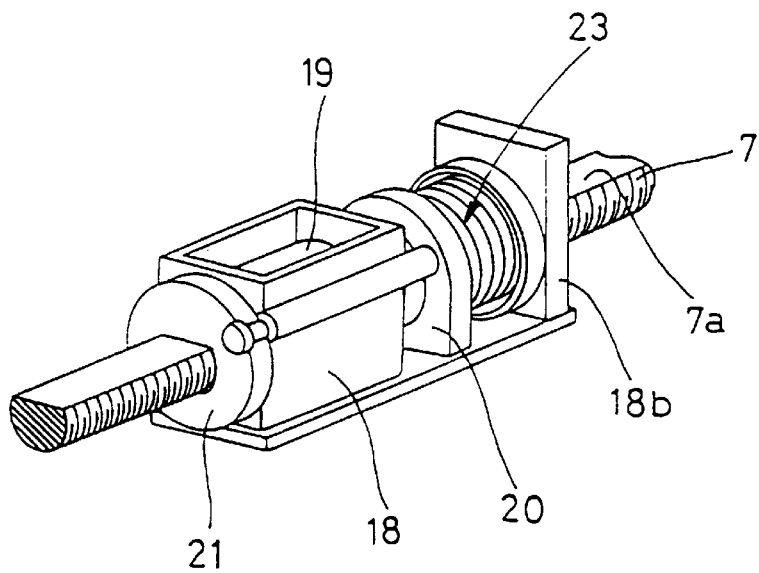
FIG. 7 is a schematic perspective view showing a second embodiment relating to the nut member.
Figure 8:
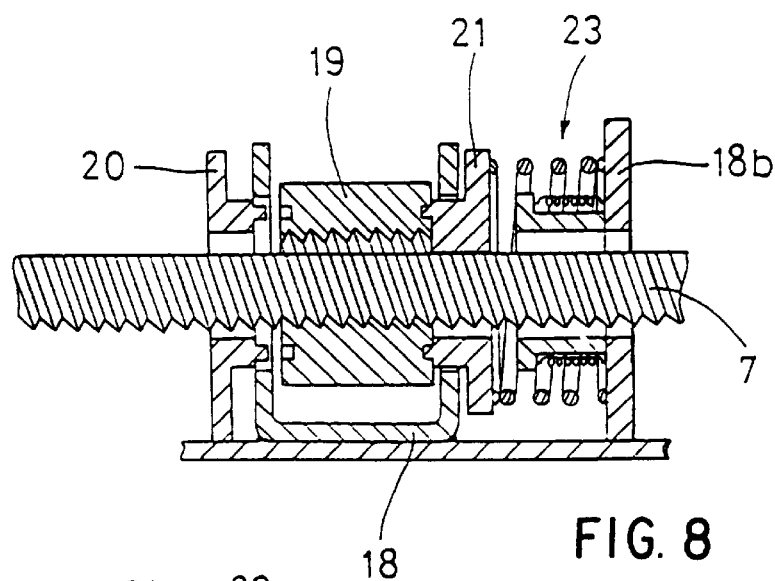
Figure 9:
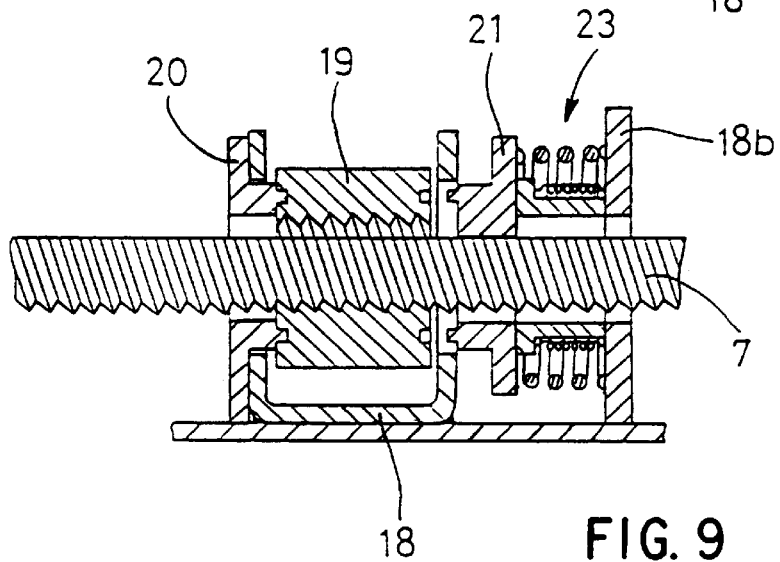
FIG. 9 is a schematic sectional view showing the condition where the nut member of the third embodiment is turned off.

Meanwhile, it can be foreseen that there may be the case where, when the exciting coil 23b is broken, switching of the engagement and disengagment of the clutch bodies 20, 21 cannot be performed. According to the above described embodiment, when the exciting coil 23b is not powered on, all the devices are placed in the first shift condition. When the operating threaded shafts 7 are rotated, all the nut members 9, 10, 12 and 13 move relative to the operating threaded shaft. Thus, shown in FIGS. 8 and 9 of the third embodiment, the nut members 9, 10, 12 and 13 may be structured so that the second clutch body 21 is engaged with the nut body 19 when the exciting coils 23b are not powered on (FIGS. 7–9). This case has an advantage that a nut member is capable of making an appropriate corresponding adjustment by powering on only the exciting coil 23b, which can accept power supply even under the estimated condition mentioned above. Further, if the nut members 9, 10 for adjusting the forward and backward position of the seat section 1 are set so that the first clutch body 20 is engaged with the nut body 19 when they are not powered on and the nut members 12, 13 for making the other adjustment are set so that the second clutch body 21 is engaged with the nut body 19 when they are not powered on, when all the exciting coils cannot be powered on, at least the adjustment of the forward and backward position of the seat section is secured by driving the motor. This can avoid a situation in which the driver cannot operate the vehicle because his foot cannot reach the pedals or his foot is caught by the dash board.

Figure 10:
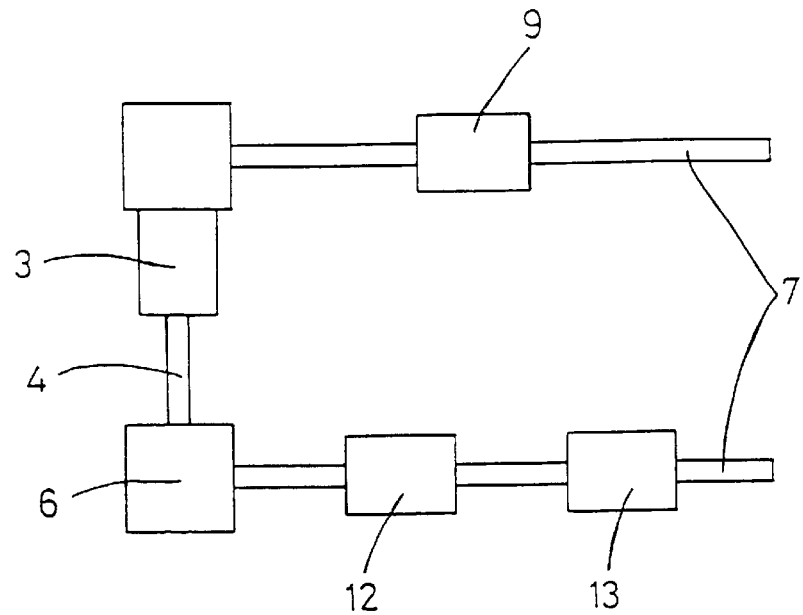
FIG. 10 is a schematic diagram showing a fourth embodiment of the arrangement of the electric driving apparatus.
Figure 11:
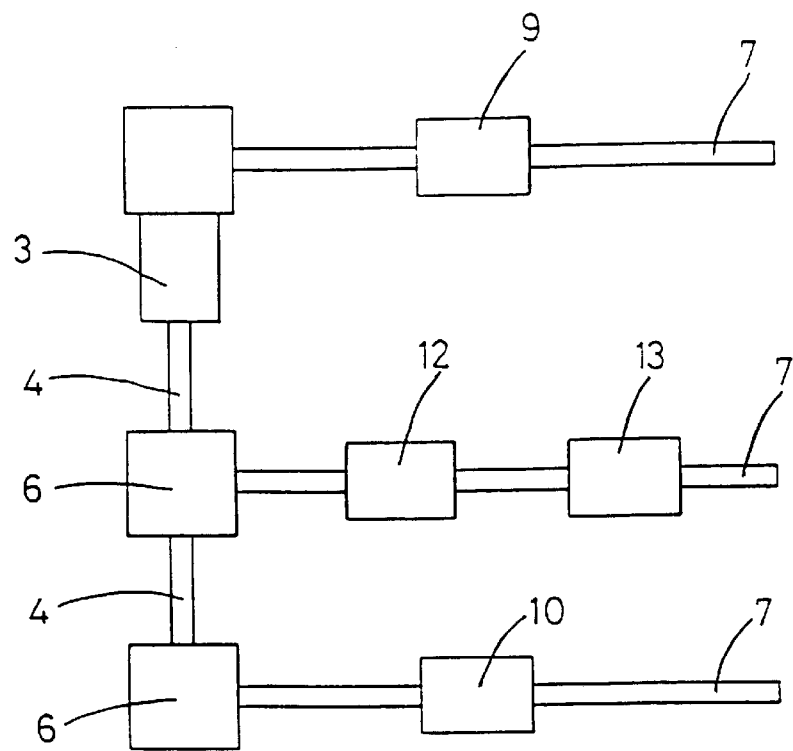
FIG. 11 is a schematic diagram showing a fifth embodiment of the arrangement of the electric driving apparatus.

On the other hand, the arrangement of the electric driving apparatus using the nut members and the operating threaded shafts is not confined to the above described embodiment, but, as shown in FIG. 10, the nut member 9 which adjusts the forward and backward position of the seat section may be mounted on one of two operating threaded shafts 7 and the nut members which adjust the heights of the seat at the front and rear ends may be mounted on the second operating threaded shaft 7. As a further embodiment, three operating threaded shafts 7 may be used as shown in FIG. 11, the nut members 12, 13 for adjusting the heights of the seat at the front and rear ends may be mounted on the operating threaded shaft 7 located in the center and the nut members 9, 10 for adjusting the forward and backward position of the seat section may be mounted on the operating threaded shafts 7, 7 located on both sides. Other arrangements may be applied, however, the embodiments shown in FIGS. 10, 11 have the advantage that the operating threaded shafts can be shorter in the first embodiment described above.

Because the present invention is configured as described above, the adjustments of the forward and backward position of the seat section and the heights of the seat at the front and rear ends can be selectively performed by driving the electric motor under the first shift condition where the first clutch body is engaged with the nut body contained in the nut member for making a corresponding adjustment by the clutch operating means. When adjusting the height of the seat at the rear end, a corresponding nut member is set in the first shift condition where the nut body is disengaged from the second clutch body and engaged with the first clutch body by means of the clutch operating means and the other nut members are set in the second shift condition. Under this condition, the electric motor is driven in a normal or reverse turn. Consequently, only the second nut member moves back and forth relative to the operating threaded shaft to achieve the adjustment of the height.

As described above, the present invention has achieved automatic adjustments of the forward and backward position of the seat section and the heights of the seat at the front and rear ends by electric driving force. The adjustments of the forward and backward position of the seat section and the heights of the seat at the front and rear ends can be selected by controlling the power to be supplied to the exciting coils by means of the clutch operating means provided in the first and second nut members. Thus, the drive control of the adjusting devices can be achieved by driving a single electric motor, eliminating the necessity of mounting a dedicated motor on each adjusting device. As a result, a large number of the adjusting parts are used in common, thereby minimizing the number of the parts, reducing the weight of the apparatus, simplifying the structure of the apparatus and further simplifying assembly which leads to a reduction in manufacturing cost.

What is claimed is:

1. A power seat driving apparatus, comprising:
   a seat section;
   an electric motor associated with said seat section;

a plurality of operating threaded shafts, each operating threaded shaft rotated by said electric motor;

at least one first nut member mounted to an operating threaded shaft for slidingly moving said seat section;

at least one second nut member connected to said seat section and mounted to an operating threaded shaft for moving said seat section in a direction different to the sliding direction, wherein each of said first and second nut members comprises:

a nut section threadably mounted on said operating threaded shaft;

a casing having a through hole through which said operating threaded shaft passes, said nut section housed within said casing; and a clutch means operably attached to said casing for switching said nut section to a first shift condition in which a rotation of said nut section is prohibited with respect to the rotation of said operating threaded shaft and a second shift condition in which said nut section is rotated integrally with the rotation of said operating threaded shaft, said clutch means having an urging means for switching said nut member to the first or second shift condition and maintaining said nut section in the condition to which switched.

2. The power seat driving apparatus according to claim 1, wherein said urging means comprises a spring.

3. The power seat driving apparatus according to claim 1, wherein said urging means comprises an exciting coil.

4. The power seat driving apparatus according to claim 1, wherein said urging means comprises a spring for maintaining said clutch means in a one of the first or second shift condition and an exciting coil for maintaining said clutch means in another of the second or first shift condition.

5. The power seat driving apparatus according to claim 1, further comprising a first connector member wherein said at least one second nut member is mounted to said operating threaded shaft and fixed to a one of a front portion and a rear portion of said seat section through said connector member and said at least one second nut member is moved relative to said operating threaded shaft to thereby tilt said seat section with respect to a base mounting the seat section.

6. The power seat driving apparatus according to claim 1, further comprising first and second connector members wherein there are two second nut members which are mounted to at least one operating threaded shaft, each second nut member connected to a different one of a front portion and a rear portion of said seat section through said first and second connector members, and said two nut members are relatively moved in opposing directions by said at least one operating threaded shaft.

7. The power seat driving apparatus according to claim 1, wherein an engaging section is formed on the outer circumference of each said operating threaded shaft, and said clutch means comprises;

said nut section threadably and rotatably supported by said operating threaded shaft and having a first clutch engaging section on one side thereof and a second clutch engaging section on the other side thereof;

a clutch receiving member disposed adjacent to one side of said nut section and held on the casing so that said clutch receiving member is not rotatable relative to the casing, said operating threaded shaft loosely passing through said clutch receiving member so as to be free from the movement in the axial direction of said operating threaded shaft, said clutch receiving member having a first clutch receiving section on a side facing said nut section so as to detachably engage with said first clutch engaging section;

a rotary member disposed adjacent to the other side of said nut section, said operating threaded shaft passing through said rotary member so as to rotate integrally with said rotary member by engaging with an operating threaded shaft engaging section when said operating threaded shaft rotates about its axis but said operating threaded shaft passing through said rotary member so as to be free from said operating threaded shaft and to move integrally with said clutch receiving member in the axial direction when said rotary member moves in the axial direction, said rotary member having a second clutch receiving section formed on the side facing said nut section so as to engage detachably with said second clutch engaging section; and a connective member selectively engaging said rotary member and said clutch receiving member with said nut section.

8. The power seat driving apparatus according to claim 1, wherein said at least one second nut member is fixed to a seat through an associated connector member.

9. The power seat driving apparatus according to claim 8, further comprising a first connector member, wherein one of said at least one second nut member is mounted to said operating threaded shaft and fixed to a one of a front portion and a rear portion of said seat through said first connector member and said one of at least one second nut member is moved relative to said operating threaded shaft to thereby tilt said seat section with respect to a base mounting the seat section.

10. The power seat driving apparatus according to claim 1, wherein an engaging section is formed on the outer circumference of each said operating threaded shaft, and said clutch means comprises;

a rotary member, having a complementary engaging section, disposed adjacent to a first end of said nut section on a first side of said casing, said operating threaded shaft passing through said rotary member so as to rotate said rotary member integrally with said operating threaded shaft by being engaged by the complementary engaging section with the engaging section of said operating threaded shaft when said operating threaded shaft rotates about its axis, said rotary member having a first clutch connecting section formed to engage said nut section;

a receiving member disposed adjacent to a second end of said nut section on a second side of said casing, said operating threaded shaft loosely passing through said receiving member which has a second clutch connecting section to which said nut section is detachably engaged; and a connective member selectively engaging said rotary member and said receiving member with said nut section.

11. The power seat driving apparatus according to claim 10, wherein said nut section has a threaded portion for receiving said operating threaded shaft and an engaging portion for selectively engaging said rotary and receiving members.

12. The power seat driving apparatus according to claim 10, wherein said urging means selectively switches between the second shift condition in which said first clutch connecting section engages said rotary member and said nut section so as to rotate integrally with said operating threaded shaft and the first shift condition in which said second clutch connecting section engages said receiving member and said nut section such that the rotation of said nut section is prohibited with respect to the said operating threaded shaft and said nut member moves axially on said operating threaded shaft.

13. A power seat driving apparatus, comprising:

a seat section;

an electric motor beneath said seat section;

a plurality of operating threaded shafts each rotated by said electric motor and having an engaging section formed on the outer circumference thereof;

a least one first nut member threadably mounted to at least one of said plurality of operating threaded shafts and relatively moved based on the rotation of said operating threaded shaft to which mounted to thereby move a seat in the axial direction of said operating threaded shaft; and at least one second nut member mounted to at least one of said plurality of operating threaded shafts for moving said seat in a direction different from said axial direction, wherein each of said first and second nut members comprises:

a nut body threadably and rotatably supported by said operating threaded shaft and having a first clutch engaging section on one side thereof and a second clutch engaging section on the other side thereof;

a clutch receiving member disposed adjacent to one side of said nut body and held on a casing so that said clutch receiving member is not rotatable relative to the casing, said operating threaded shaft loosely passing through said clutch receiving member so as to be free from the movement in the axial direction of said operating threaded shaft, said clutch receiving member having a first clutch receiving section on a side facing said nut body so as to detachably engage with said first clutch engaging section;

a rotary member disposed adjacent to the other side of said nut body, said operating threaded shaft passing through said rotary member so as to rotate integrally with said rotary member by engaging with an operating threaded shaft engaging section when said operating threaded shaft rotates about its axis but said operating threaded shaft passing through said rotary member so as to be free from said operating threaded shaft and to move integrally with said clutch receiving member in the axial direction when said rotary member moves in the axial direction, said rotary member having a second clutch receiving section formed on the side facing said nut body so as to engage detachably with said second clutch engaging section; and a connective member selectively engaging said rotary member and said receiving member with said nut body.

14. A power seat driving apparatus, comprising:

a single electric motor disposed to a seat side;

a plurality of operating threaded shafts, each threaded shaft rotated by said singe electric motor;

at least one first nut member for moving said seat in an axial direction by being relatively moved based on the rotation of a said operating threaded shaft to which mounted;

at least one second nut member for adjusting the height of at least one of the front and rear portions of said seat by the relative movement of said at least one second nut member based on the rotation of a said operating threaded shaft to which mounted; and a connector member for connecting said seat to said at least one second nut member.

* * * * *